United States Patent
Hoffmann

[19]

[11] Patent Number: 6,062,637
[45] Date of Patent: May 16, 2000

[54] SUNROOF FOR MOTOR VEHICLES

[75] Inventor: Andreas Hoffmann, Bensheim, Germany

[73] Assignee: Meritor Heavy Vehicle Systems, LLC, Troy, Mich.

[21] Appl. No.: 09/151,509

[22] Filed: Sep. 11, 1998

[30] Foreign Application Priority Data

Sep. 12, 1997 [DE] Germany ............... 197 41 134

[51] Int. Cl.⁷ ............................................. B60J 7/08
[52] U.S. Cl. ................. 296/216.02; 296/218; 296/224
[58] Field of Search .................................. 296/218, 224, 296/216.02; 292/196, 263, DIG. 5; 16/342

[56] References Cited

U.S. PATENT DOCUMENTS

| | | | |
|---|---|---|---|
| 2,164,515 | 7/1939 | Goserud | 292/263 |
| 4,618,176 | 10/1986 | Farmont | 296/218 X |

FOREIGN PATENT DOCUMENTS

| | | | |
|---|---|---|---|
| 3640623 | 12/1987 | Germany | 296/218 |
| 577305 | 5/1946 | United Kingdom | 292/263 |
| 2145466 | 3/1985 | United Kingdom | 296/224 |

*Primary Examiner*—Dennis H. Pedder
*Attorney, Agent, or Firm*—Howard & Howard

[57] ABSTRACT

A sunroof, for a motor vehicle having a roof opening, includes a roof frame locatable in the roof opening for defining the perimeter of the roof opening and at least one panel fitting within the roof frame arranged to close the roof opening. The panel is hingedly mounted to the roof frame at a forward panel edge so that the panel can pivot about the hinged mounting so as to rise at a rear panel edge to open the sunroof. A positioning device is arranged adjacent the rear panel edge to hold the panel open. The positioning device includes at least an upper link and a lower link connected pivotally together at a knee joint which is movable with respect to the roof frame, with the upper link being connected to the panel at the end of the panel opposite the knee joint and the lower link being connected to the roof frame. A clamp is arranged at the knee joint to lock the knee joint. The knee joint being such that the links form at least a part of a lamella pack construction where adjacent lamellae interact frictionally under compressive forces produced by the clamp to lock the knee joint.

16 Claims, 11 Drawing Sheets

FIG. 18

SUNROOF FOR MOTOR VEHICLES

BACKGROUND OF THE INVENTION

1. Field of the Invention

The invention relates generally to sunroofs for motor vehicles. In particular, this invention relates to a sunroof which opens by pivoting about a hinge.

2. Description of the Prior Art

Figure 1:
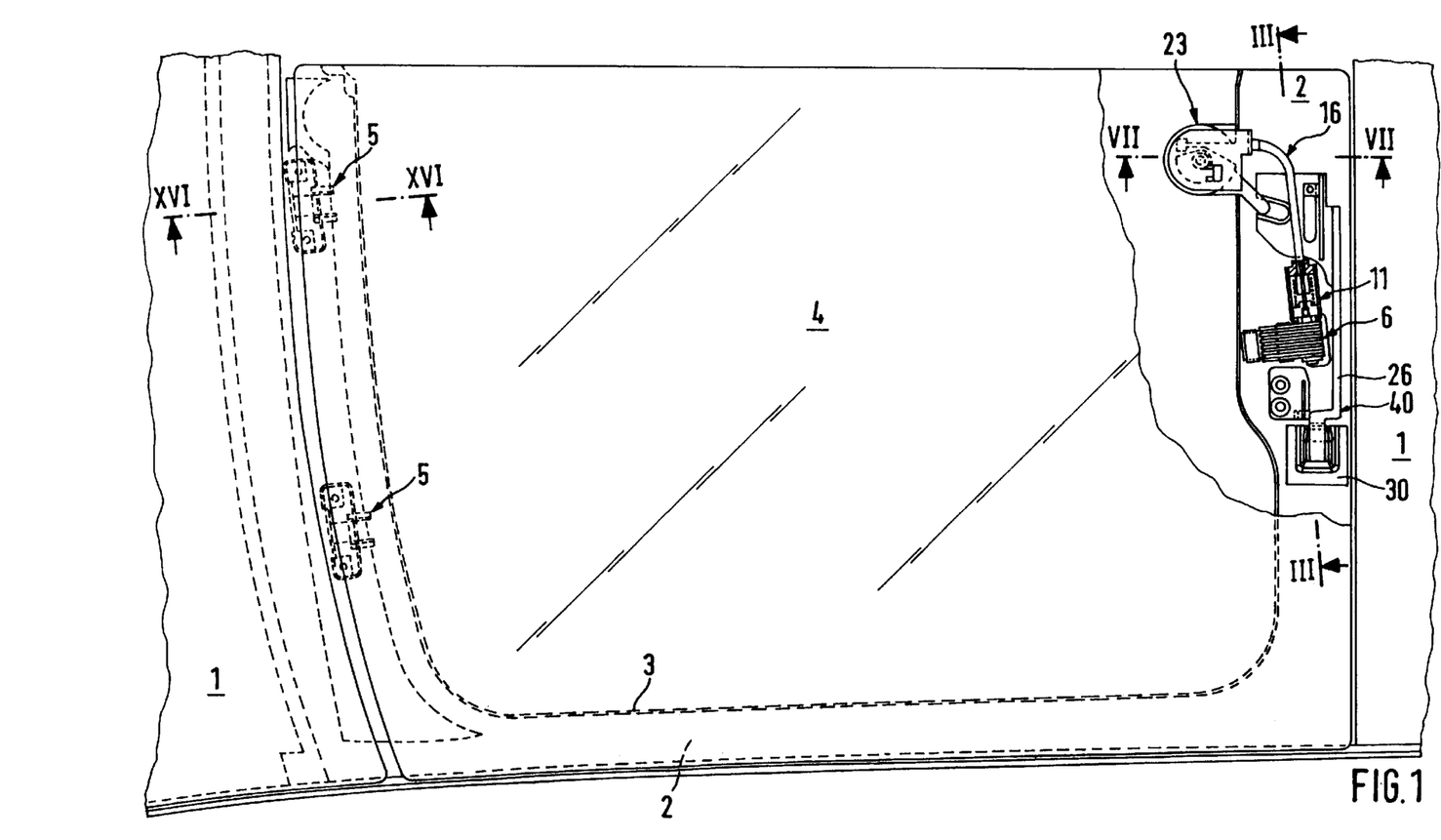
FIG. 1 shows a partially fragmented top view of a sunroof with a closed panel.

Sunroofs of the above design are known from German Patent Publication No DE 42 03 806 C1, FIG. 1. These are simple roof structures with a panel which is conventionally formed from a glass plate. The panel is hinged to the roof frame at the front and can be swivelled into a ventilation position by raising its rear edge by means of a knee-joint-like positioning lever device. In the ventilation position, a ventilation gap is formed between the rear edge of the panel and the fixed vehicle roof. It is desirable to be able to set the height of the ventilation gap and safely fix the panel in each set position in order to achieve a fixed condition of the panel in any desired ventilation position of the panel when the vehicle is travelling.

In another known sunroof (DE 22 54 962 A1), whose steel panel is still at least partially movable over the rear fixed roof surface when the panel is swivelled out into a ventilation position, the ventilation gap can be set because the panel can be locked in any position by special locking means. In this case, however, the panel is positioned by means of simple guide links swivel-mounted on both the roof frame and the panel. The ends of the guide links on the frame side are rigidly connected together by means of a bearing shaft. The special locking means, formed like brake lamellae, engage on this stationary bearing shaft which does not participate in the movements of the panel.

SUMMARY OF THE INVENTION

The present invention overcomes disadvantages of the prior art in that it is reliably able to fix the panel in any set ventilation position by simple means.

By means of the design of links fixed to the panel and to a roof frame and mutually to a knee joint and in conjunction with a clamping device arranged on the knee joint, it is possible to lock the knee joint by means of the clamping device in any pivotal panel position with the panel being in a safe condition. At the same time, a very good guiding and stability of the knee joint is achieved by means of a lamella pack design of the knee joint so that for a safe condition of the panel it may be sufficient only to arrange a correspondingly formed positioning device approximately in the center of the rear edge of the panel.

Preferably, the force applied to the lamella pack by means of the clamping device is a spring force. This ensures that the lamella pack is reliably compressed by frictional constraint in any desired position of the panel.

Advantageously, the clamping device is formed with a sleeve coaxially fixed to a knee joint shaft which passes through the lamella pack. A helical compression spring in the sleeve acts between the free end of the sleeve and the pack. In this case, the helical compression spring, provided to generate the spring force, acts directly via the sleeve with a tensile force on the knee joint shaft and with a compressive force on the lamella pack so that the lamella pack is pressed by the spring force from both sides in the manner of pincers. Individual lamellae are compressed by frictional constraint in this way.

In an embodiment of the invention, the force compressing the lamella pack by frictional constraint, by means of the clamping device, may be removed by removing the spring force acting on the lamella pack. This is preferably achieved by means of a Bowden cable which is guided between the clamping device and a rotary handle operating device fixed to the underside of the panel. By rotating the handle, the helical compression spring is compressed via the Bowden cable so that the spring force applied to the lamella pack is removed and/or reduced and the knee joint becomes movable for swivel movements of the panel. Since the operating device follows the panel when swivel movements take place and whereas the clamping device takes part in the displacements of the knee joint, the flexible Bowden cable provides a problem-free connection between the operating device and the clamping device allocated to the knee joint. The locally separate fitting of the positioning device, with allocated clamping device, and the operating device makes this design of the sunroof particularly suitable for a divided sunroof consisting of two adjacent roof openings, separated from each other by means of a central web, each allocated a panel. In this case, the positioning device may be arranged approximately in the center of the rear edge of the panel, whereas an operating device may be fitted to the rear inner corner of each panel. As a result, the two operating devices are positioned alongside each other and may be operated comfortably with one hand.

A locking device which locks the panel in a closed position may be provided for the panel. This locking device is suitably operated by the same operating device which operates the positional clamping device. As the operating device follows the movement of the panel, coupling elements, which are coupled when the panel is closed and uncoupled when the panel is opened, are provided on the operating device and on the locking device. Such a locking device preferably consists of a bolt guided on the roof frame in a movable manner and a bolt pocket allocated to the bolt and fixed to the underside of the panel. To move the bolt, a guide groove is provided in the bolt which is open towards the top and runs transversely to the direction of movement of the bolt. A guide pin, which is fitted at the end of a swivel arm and points downwards, is allocated to the groove. When the guide pin is in the guide groove, operation of the rotary handle causes the bolt to move in one or the other direction. The guide groove on the bolt and the guide pin on the swivel arm of the operating device also provide the coupling and uncoupling of the operating device and the locking device. To draw the closed panel into its end position, the bolt and the bolt pocket are formed by the attachment of corresponding inclined surfaces. Appropriately, it is provided that the two end positions of the bolt are latched in detachable manner by ensuring that the bolt is unlatched by applying a displacement force to the bolt.

The positioning device and the clamping device may be designed to avoid an excessive pressing of the lamella pack in the last closure phase of the panel and, accordingly, also in the first opening phase of the panel to avoid locking the lamella pack with excessive frictional constraint in these phases.

The panel of the invention may easily be removed by unlocking one of the links from its coupling point on the frame side and unhinging the front hinges so that the free roof opening is available to persons in the vehicle.

BRIEF DESCRIPTION OF THE DRAWINGS

Further particulars of the invention will be described in greater detail below with reference to the drawings which show an embodiment partially in diagrammatic form only.

DESCRIPTION OF A PREFERRED EMBODIMENT

A preferred embodiment of the present invention is shown in the drawings by way of a preferred example of use. In the preferred example of use, a sunroof, further described below, is divided into two regions, namely a left region and a right region. Relative to the forward direction of travel of a vehicle installed with the split sunroof, the region on the left is illustrated in the drawings. The region on the right is formed in mirror image. Both the left and right sunroof regions may be operated independent of each other. The sunroof is operated steplessly and with one hand. To pivot the panel out, the panel is moved upwards into the desired position after corresponding operation by hand, which is described below, has been performed. The sunroof closure process is assisted by the weight of the panel.

Figure 2:
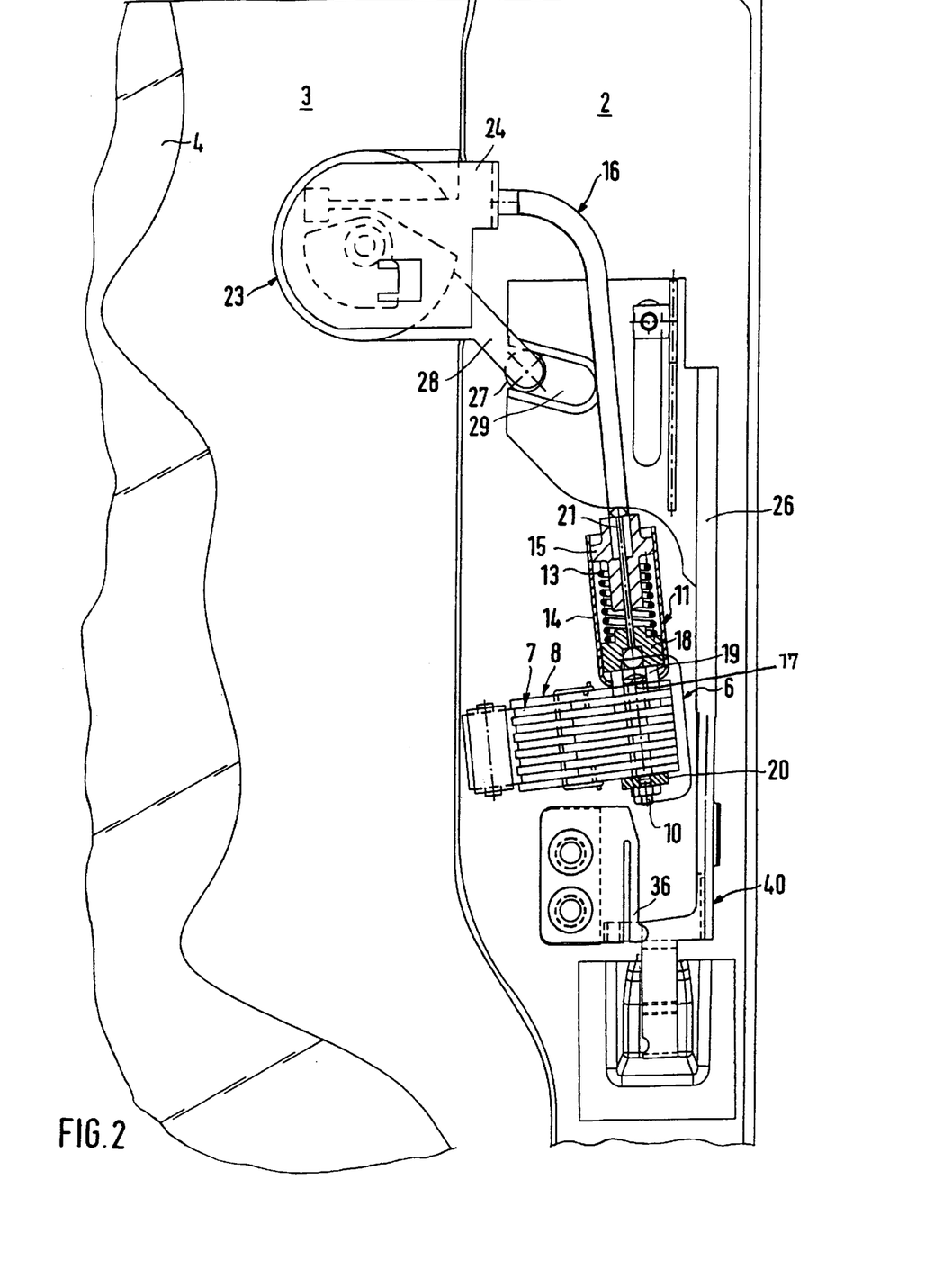
FIG. 2 shows an enlarged top view of a positioning device, clamping device, and operating device of FIG. 1.
Figure 3:
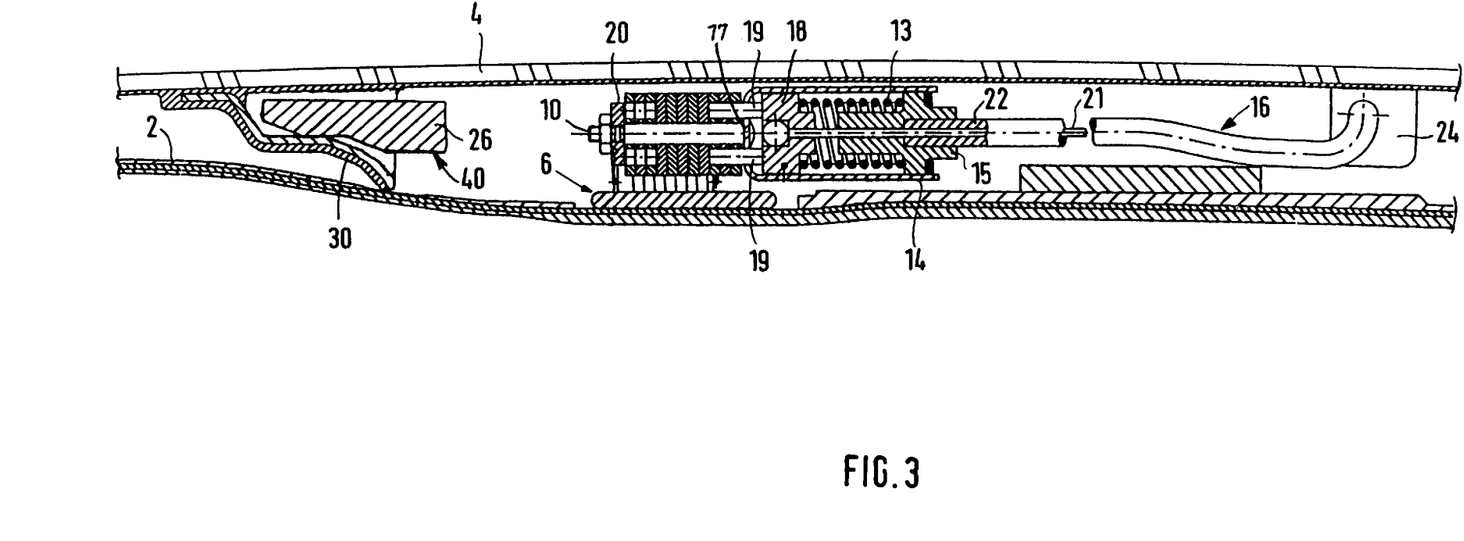
FIG. 3 shows a fragmented cross section taken along lines III—III in FIG. 1.
Figure 11:
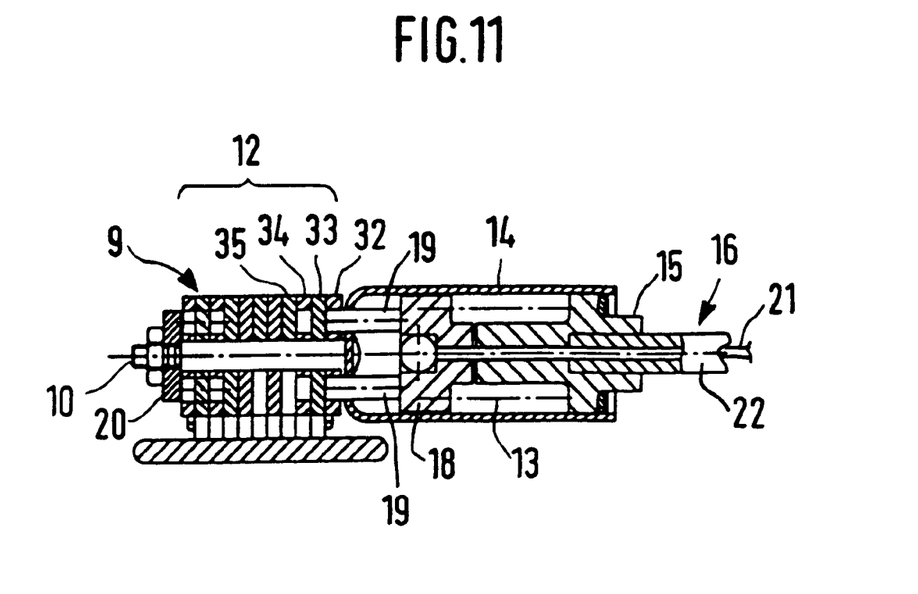
FIG. 11 shows a longitudinal section of a lamella pack and the clamping device with the lamella pack compressed by frictional constraint.
Figure 12:
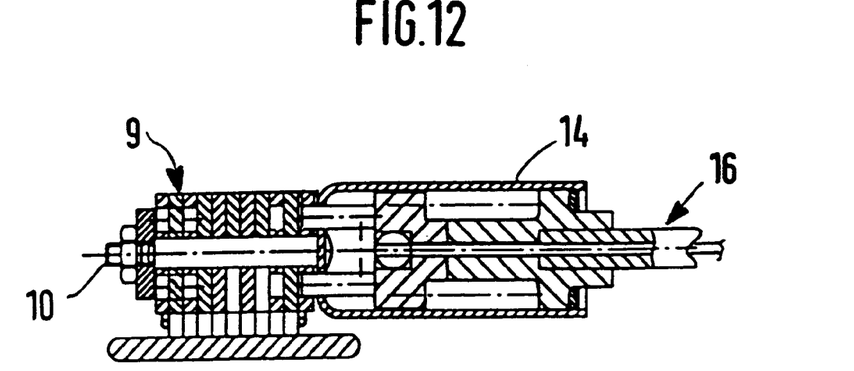
FIG. 12 shows the longitudinal section of the lamella pack and the clamping device of FIG. 11 with the lamella pack relieved of a spring force allowing for the swivel displacement of the panel.

The basic design of the sunroof is shown in FIG. 1 in conjunction with FIGS. 2–6, to which reference will first be made. A roof opening 3, bordered by a roof frame 2, is located in a fixed roof surface 1 of a vehicle roof. A panel 4 which is connected at a front edge to the roof frame 2 by means of two hinges 5 is allocated to the roof opening 3. A positioning device which permits pivotal movements of the panel and is denoted generally by the reference numeral 6 is positioned adjacent to a rear edge of the panel 4. The positioning device 6 consists of an upper lever 7 coupled to the panel 4, a lower lever 8 coupled to the roof frame 2 and a knee joint 9, having a knee joint shaft 10, which connects or links the upper lever 7 and the lower lever 8 together so that the levers 7 and 8 can swivel. In the region of the knee joint 9, the links 7 and 8 are formed in a lamella-like manner, wherein the lamellae of both links 7 and 8 are arranged to engage alternately with each other as best seen in FIG. 2. A clamping device, which is generally denoted by the reference numeral 11 and which follows the movements of the knee joint, is arranged on the knee joint 9. With removable force application, this clamping device 11 acts on the lamella pack, which is formed by the lamellae of both the links 7 and 8 and is generally denoted by the reference numeral 12 as shown in FIG. 11, to compress the lamella by frictional constraint. The force applied to the lamella pack by the clamping device 11 occurs by means of spring force, as described in greater detail below.

The compression of the lamellae of the lamella pack 12 by frictional constraint is produced by a powerful helical compression spring 13 located in a sleeve 14 aligned coaxially to the knee joint shaft 10. The helical compression spring 13 is supported on a plug 15 pressed into a free end of the sleeve 14 and simultaneously guides a Bowden cable 16. The sleeve 14 and the knee joint shaft 10 of the lamella pack 12 are firmly connected together. Located in a base 17 of the sleeve 14 on the lamella side is a hole pattern, described in greater detail below, through which a pressure piece 18, having four pins 19 and which is stressed by the spring 13, engages and presses the lamella pack 12. At the opposing end of the knee joint shaft 10 is a washer 20 which is firmly screwed to the knee joint shaft 10 and rests on the lamella pack 12 to provide force abutment. The movement of the knee joint 9 is inhibited and arrested by the friction between the individual lamellae. As a result, the panel 4 remains stationary in a fixed position.

Figure 7:
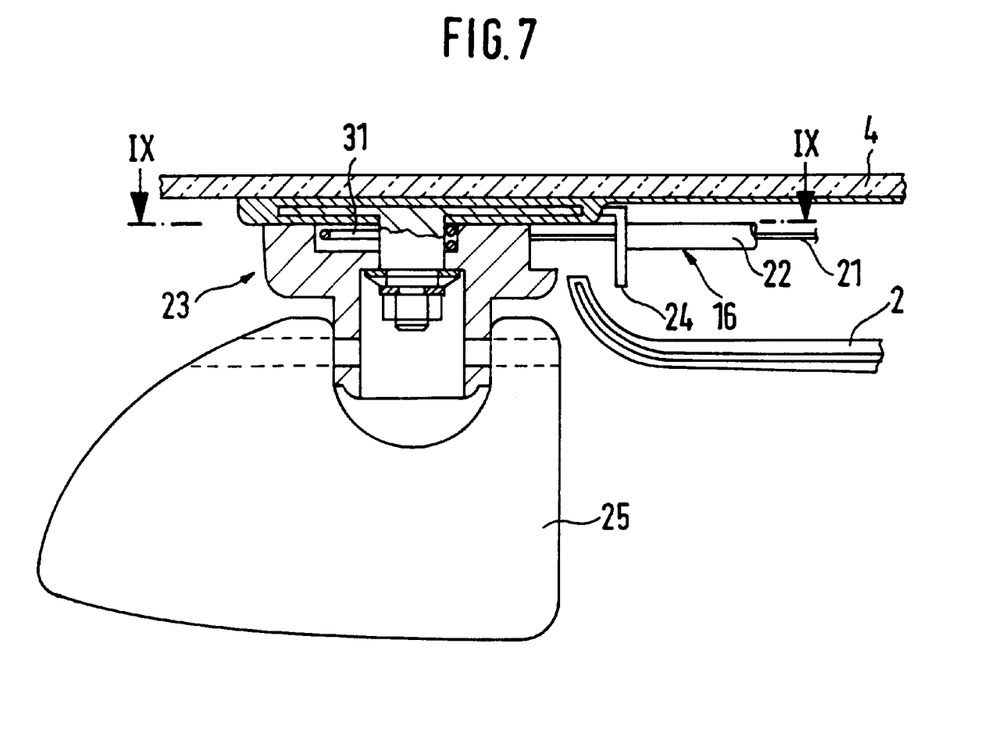
FIG. 7 shows a fragmented cross section of the operating device taken along lines VII—VII in FIG. 1 with a rotary handle folded downwards.
Figure 8:
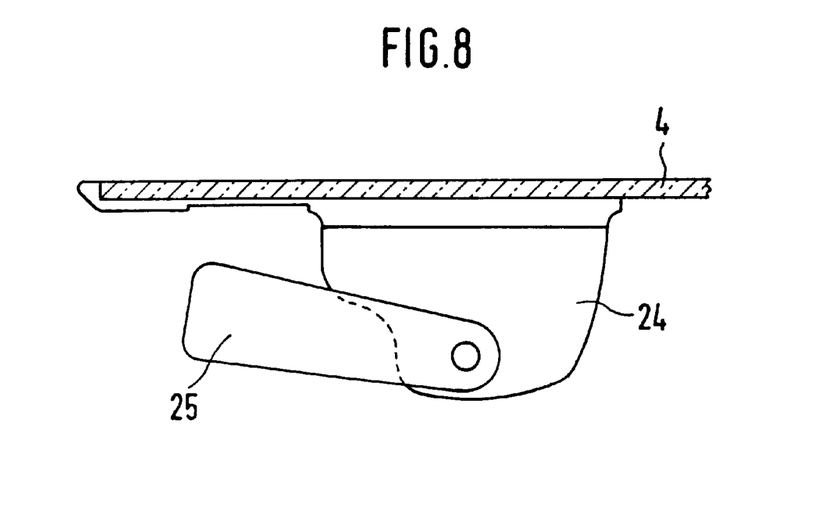
FIG. 8 shows a side view of the operating device with the rotary handle folded upwards.

To adjust the panel positioning height, the spring force is removed from the lamellae of the lamella pack 12 by means of the Bowden cable 16, thereby allowing the knee joint to move or swivel. A core 21 of the Bowden cable 16 engages on the pressure piece 18. A sleeve 22 of the Bowden cable 16 engages on the plug 15. A free end of the Bowden cable 16 is guided to a rotary handle operating device 23 fixed to the underside of the panel 4. The sleeve 22 engages on a housing 24 of the operating device 23 and the core 21 engages on a rotary handle 25 of the operating device 23 as shown is FIGS. 9 and 10. FIG. 7 shows that the rotary handle 25 may be folded down for operation but is otherwise stored in a folded-up position on the panel 4 as shown in FIG. 8.

The rotary handle operating device 23 also has a panel locking and unlocking function. For this purpose, a bolt 26, which is movably guided on the roof frame 2, is provided. The bolt 26 is moved to and from by a guide pin 27 which is arranged pointing downwards on the end of a swivel arm 28 operated by the rotary handle 25. To this end, the guide pin 27 engages in a guide groove 29, which is open towards the top, of the bolt 26. In order that the guide pin 27 is located in the guide groove 29 when the panel 4 is closed, the user may only move the panel 4 when the rotary handle 25 is in a position in which the guide pin 27 is above the guide groove 29. This may be assured by corresponding stops in the operating device.

Figures 9, 10:
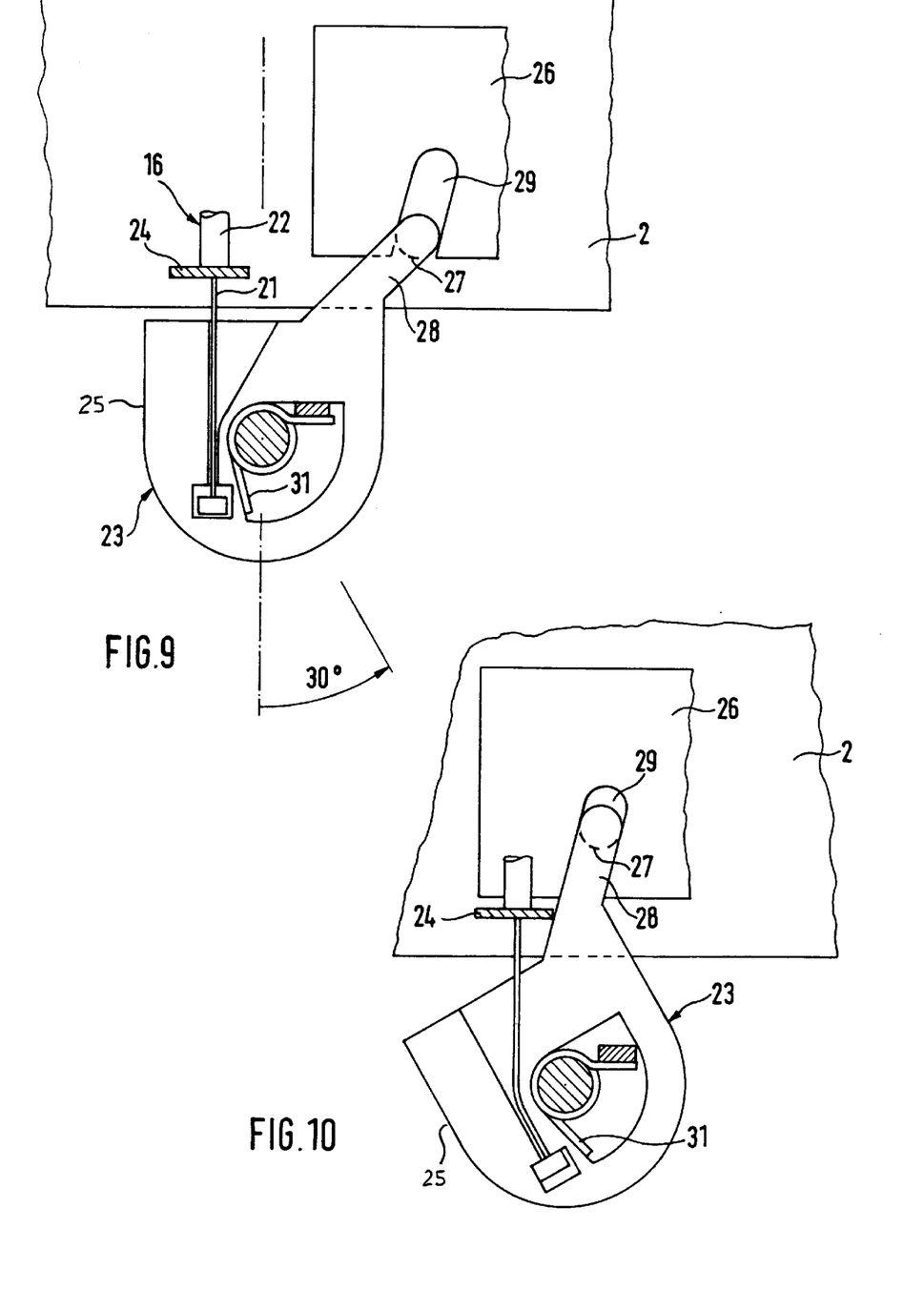
FIG. 9 shows a cross section of the operating device taken along lines IX—IX in FIG. 7 with the operating device in a rest position.
FIG. 10 shows the cross section of the operating device of FIG. 9 with the operating device in an operating position.

To open the panel 4, the rotary handle 25 must be turned clockwise from the user's point of view. When the rotary handle 25 is turned clockwise, the bolt 26 is drawn out of a bolt pocket 30 fixed to the panel 4, thereby unlocking the panel 4 and the Bowden cable 16 is operated, as shown in FIG. 10, thereby relieving the lamella pack 12 of the spring force. This makes the positioning device 6 movable, thereby allowing the panel 4 to be pivoted outward in an upward direction. If the rotary handle 25 is released, the helical compression spring 13 stresses the lamella pack 12 again so that the panel 4 remains stationary in the desired position as a result of the surface compression produced and the frictional forces between the lamellae. The rotary handle 25 is moved back into the rest position again by a leg spring 31 shown in FIGS. 9 and 10.

If the swivelled-out panel 4 is to be closed, the rotary handle 25 is again turned clockwise from the user's point of view causing the Bowden cable 16 to again relieve the lamella pack of the spring force so that the panel 4 becomes movable and may be closed. To lock the panel 4, the rotary handle 25 is turned counter-clockwise from the user's point of view causing the bolt 26 to be pushed back into the bolt pocket 30 fixed to the panel 4 by way of the engagement of the guide pin 27 with the guide groove 29.

A peculiarity arises here. As the operating direction of rotation for the Bowden cable is clockwise and the operating direction for the locking is counter-clockwise, i.e. they are opposite, the Bowden cable 16 is already relieved again and the lamella pack 12 of the positioning device 6 is arrested by friction when the bolt 26 locks the panel 4. However, since the panel 4 still needs to be pulled downwards, approximately a further 6 mm, the lamella pack 12 may not be arrested by friction during this last phase of the closure process. The following operation is provided to at least reduce the frictional constraint during this last closure phase.

The pins 19, which are of equal length and which are fixed in an axis-parallel manner to the knee joint shaft 10, do not press on a first lamella 32 of the lamella pack 12 which belongs to the lower lever 8 but on a second lamella 33 which belongs to the upper lever 7. A third lamella 34, which also belongs to the lower lever 8, has the hole pattern similar to the first lamella 32. If the knee joint 9 comes into the position in which the bolt 26, in cooperation with the bolt pocket 30, is to pull the panel 4 finally shut, a further hole pattern present in the second lamella 33 comes to overlap the hole pattern in the first and third lamellae 32 and 34 so that the pins 19 may now penetrate further into the lamella pack 12 until the pins 19 impact on a fourth lamella 35 which has no hole pattern. As a result of the movement of the pressure piece 18 and/or the pins 19 fitted to the pressure piece 18, the helical compression spring 13 is relieved to the extent that the lamellae of the lamella pack 12 may be turned with respect to each other with a manual force initiated via the operating device 23 so that the bolt 26 can pull the panel 4 finally shut without having to overcome considerable frictional resistance from the knee joint 9.

Figure 14:
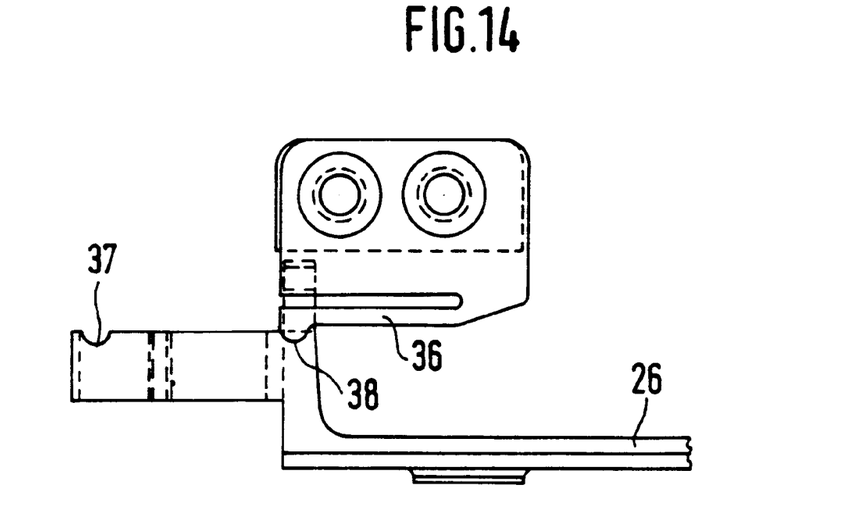
FIG. 14 shows a fragmented top view of an end of a bolt with the bolt latched in a bolt closed position.
Figure 15:
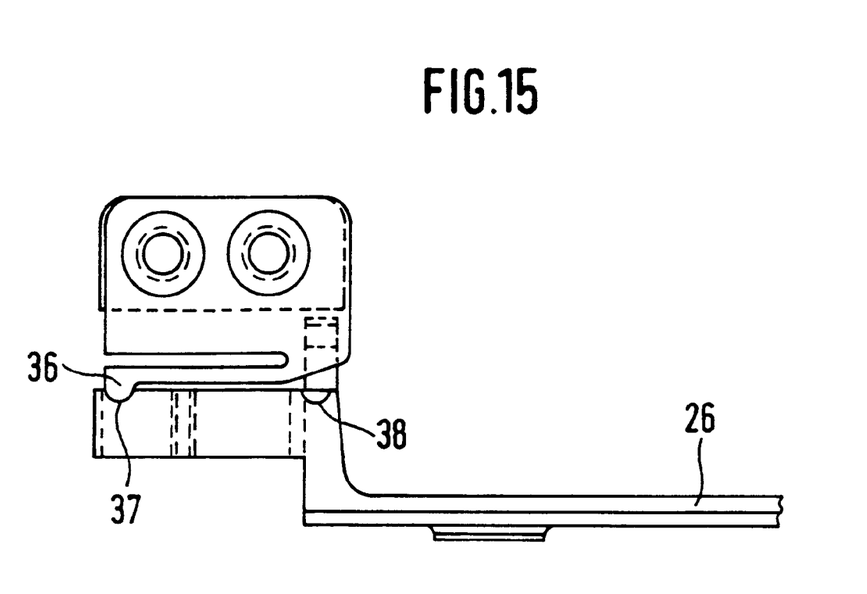
FIG. 15 shows a fragmented top view of the bolt of FIG. 14 with the bolt latched in a bolt opened position.

The end positions of the bolt 26 are secured by the latching arrangement shown in FIGS. 14 and 15. A resilient latching element 36 fixed to the roof frame 2 engages into a corresponding latch recess 37 and/or 38 at the end of the bolt 26. The latching may be removed by the displacement force applied to the bolt 26.

Figure 4:
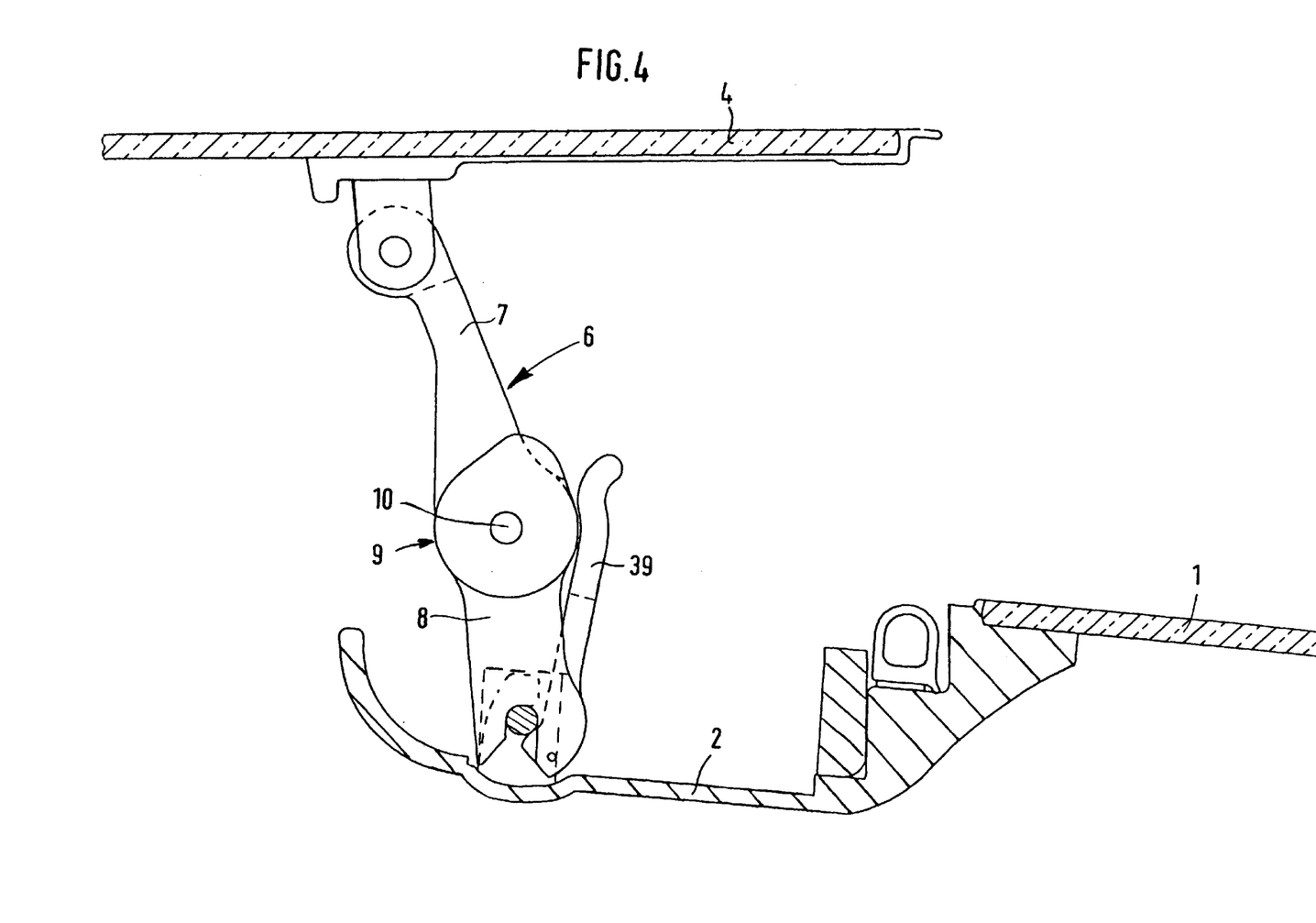
FIG. 4 shows a side view of the positioning device with the panel swivelled out and a lower lever locked.
Figure 5:
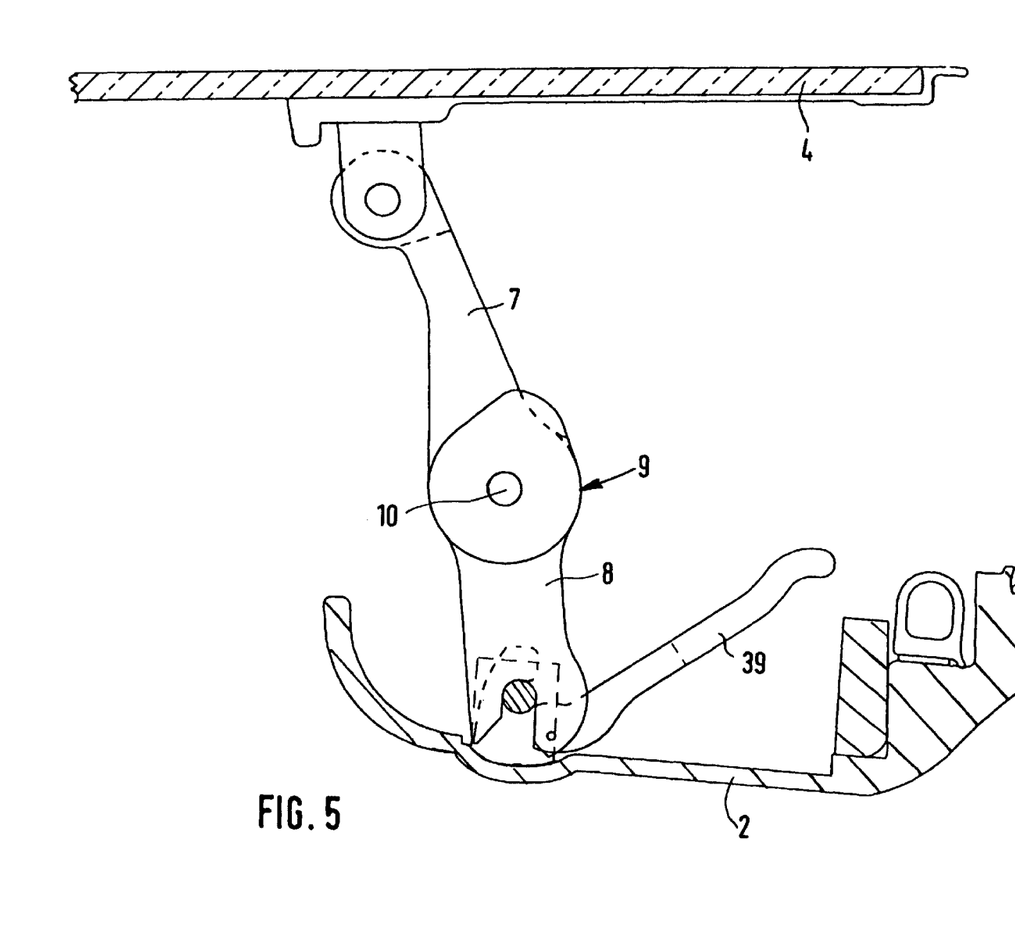
FIG. 5 shows a side view of the positioning device of FIG. 4 with the lower lever unlocked.
Figure 6:
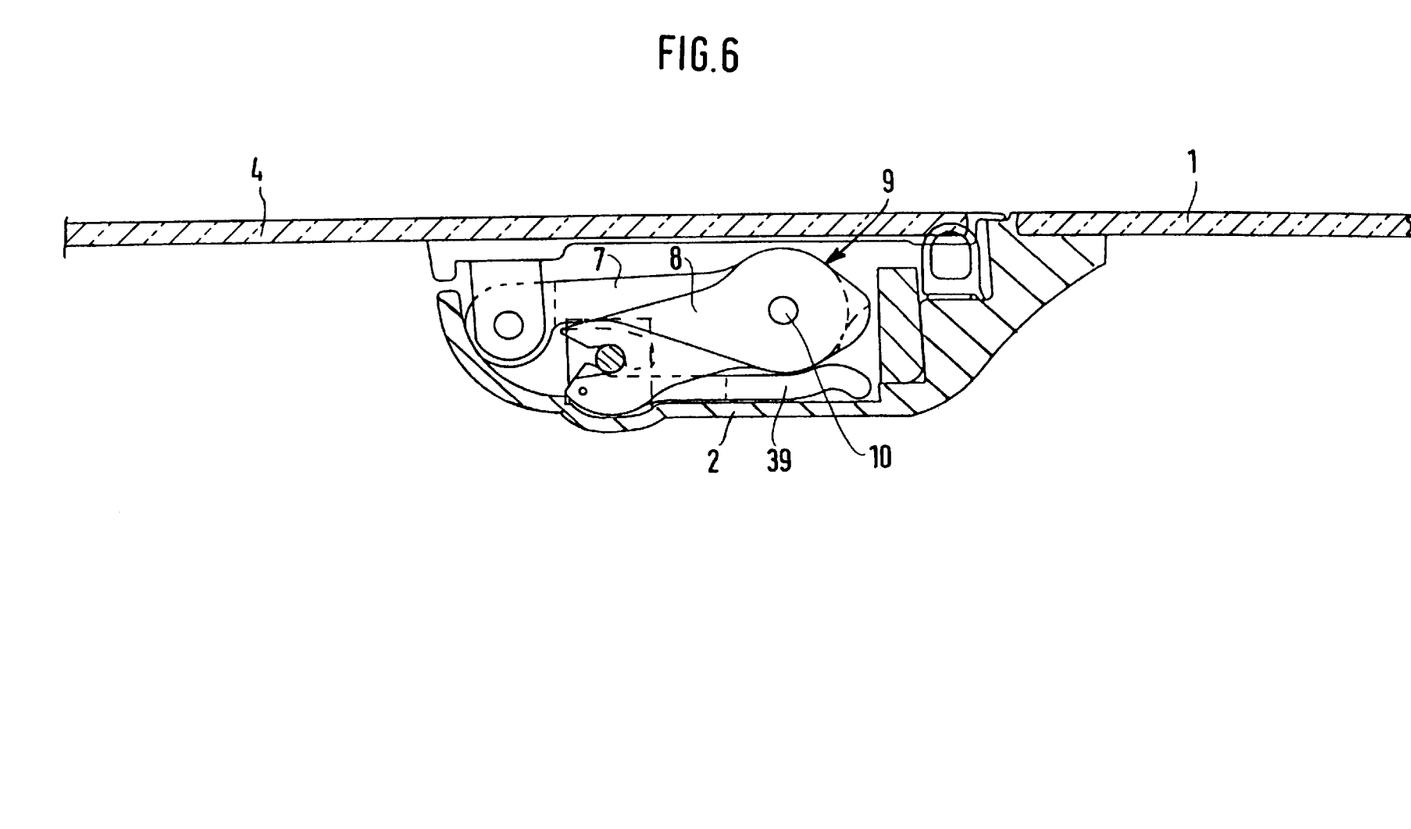
FIG. 6 shows a side view of the positioning device with the panel closed.
Figure 16:
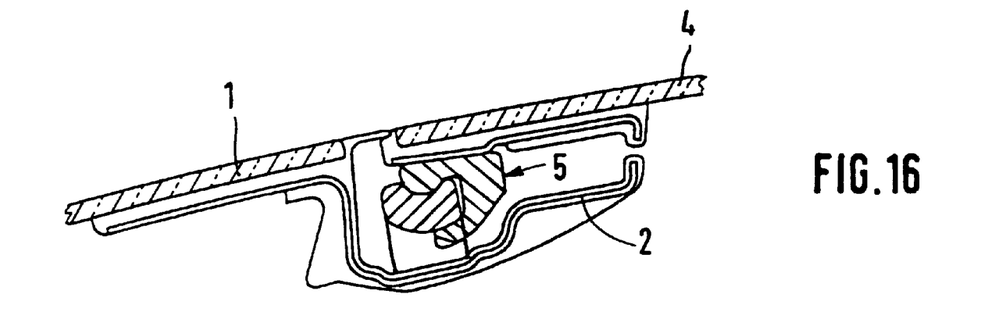
FIG. 16 shows a fragmented cross section of a front panel hinge taken along lines XVI—XVI in FIG. 1 with the panel closed.
Figure 17:
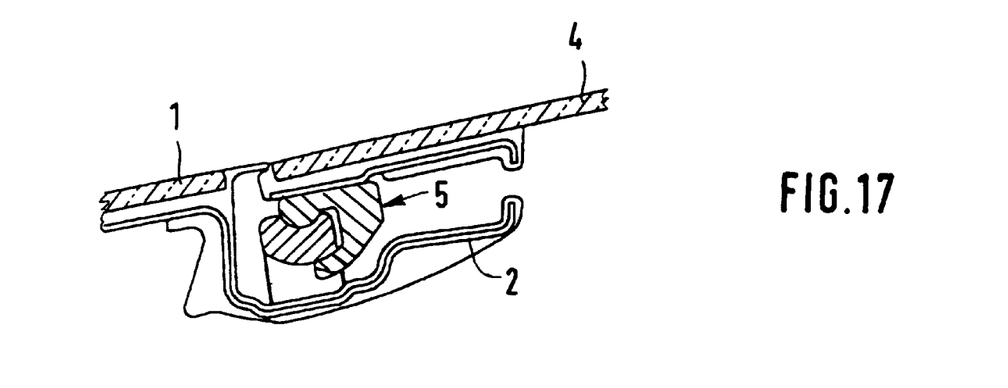
FIG. 17 shows the fragmented cross section of the front panel hinge of FIG. 16 with the panel swivelled out.
Figure 18:
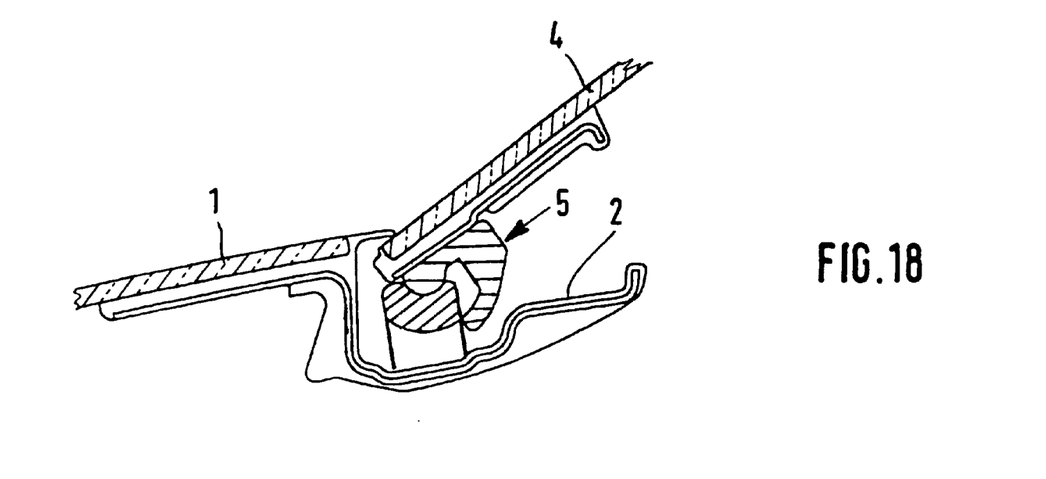
FIG. 18 shows the fragmented cross section of the front panel hinge of FIGS. 16 and 17 with the panel swivelled further upwards for the purpose of removing the panel.

To remove the panel 4 the positioning device 6 is released from the roof frame 2 as shown in FIGS. 4 and 5. For this purpose a latching hook 39 is swivelled, thereby releasing the lower coupling point of the positioning device 6. The panel 4 may then be lifted up at its rear edge and the hinge elements of the front hinges 5 may be released from each other, as shown in FIGS. 16 to 18.

Figure 13:
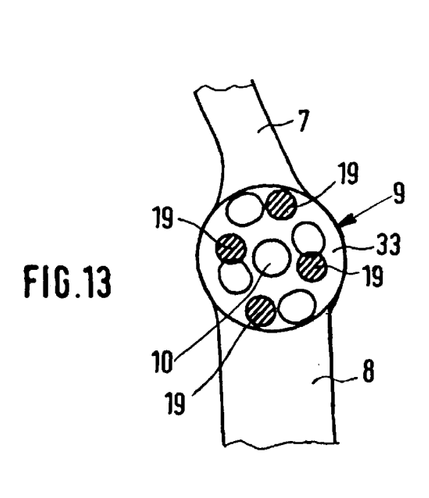
FIG. 13 shows a cross section of the lamella pack with a surface view of a second lamella.

With respect to FIG. 13, it should be noted that the hole pattern in the second lamella 33 consists of oblong holes so that he upper lever 7 and the lower lever 8 of the positioning device 6 may be swivelled slightly against each other during the last phase of the panel closure movement.

It will be appreciated that modifications and variations of the invention may be made and that these are believed to be within the scope of the present invention as defined by the claims appended hereto.

What is claimed is:

1. A sunroof for a motor vehicle having a roof opening, the sunroof comprising:

(a) a roof frame locatable in the roof opening for defining the perimeter of the roof opening, (b) at least one panel fitting within the roof frame arranged to close the roof opening, (c) said panel hingedly mounted to said roof frame at a forward panel edge so that said panel can pivot about said hinged mounting so as to rise at a rear panel edge to open the sunroof, (d) a positioning device arranged adjacent the rear panel edge to hold said panel open, (e) said positioning device comprising at least an upper link and a lower link connected pivotally together at a knee joint which is movable with respect to said roof frame, said upper link being connected to said panel at the end of said panel opposite said knee joint, and said lower link being connected to said roof frame, said knee joint being such that said links form at least a part of a lamella pack, (f) a clamp adjacent said knee joint to lock said knee joint, said clam including a spring external said links, such that adjacent lamellae are frictionally interactable under a compressive force produced by said clamp.

2. A sunroof according to claim 1, wherein said spring is located within a cylindrical sleeve, said sleeve aligned coaxially with and fixed at one end of said sleeve to a knee joint shaft which passes transversely through said lamella pack in a pivot axis, said spring arranged to act displaceably between a free end of said sleeve opposite said one end of said sleeve and said lamella pack at said knee joint.

3. A sunroof according to claim 2, wherein the compressive forces of said clamp on said lamella pack are removably provided by said spring.

4. A sunroof according to claim 3, wherein the arrangement to relieve the spring force acting on said lamella pack comprises a Bowden cable, a core of which at one end of said Bowden cable engages with a pressure piece slidable axially in said cylindrical sleeve, and a cable sleeve engaging with a plug in a first bend of said sleeve and wherein the opposite end of said Bowden cable is guided to a rotary handle operating device which is fixed to the underside of said panel with said cable sleeve engaging a housing of said operating device and said cable core engaging a rotary handle of said operating device.

5. A sunroof according to claim 4, wherein said rotary handle operating device fixed to the underside of said panel and provided to relieve the force applied to said lamella pack of said positioning device is coupled to a locking device for said panel in a panel closure position by means of a swivel arm also operated by said rotary handle of said operating device in such a way that said panel may be locked and unlocked by means of said rotary handle, wherein coupling between said swivel arm and said locking device is necessarily removed when said panel is tilted to open.

6. A sunroof according to claim 5, wherein said locking device comprises a bolt movably guided on said roof frame and a bolt pocket allocated to said bolt and fixed to the underside of said panel, wherein a guide groove which is open towards the top and runs transversely to the direction of movement of said bolt is provided in said bolt, to which said groove a guide pin is allocated which is attached to the end of said swivel arm and points downwards, and wherein said bolt and bolt pocket are arranged to pull the closed panel into an end position.

7. A sunroof according to claim 6, wherein said bolt has two end positions which are secured by a latching means which may be removed when displacement force is applied to said bolt.

8. A sunroof according to claim 7, wherein pins of a substantially equal length are fixed to said pressure piece so that the axes of said pins are parallel to said knee joint shaft, which said pins are guided through corresponding perforations in the base of said cylindrical sleeve and are supported in said lamella pack with the free ends of said pins, wherein a first lamella of said pack being part of said lower link adjacent to said clamp and a third lamella of said pack being part of said lower link, each first and third lamella having a perforation precisely corresponding to said pins and the peripheral distribution of said pins on said knee joint shaft, whereas a second lamella being part of said upper lever has a perforation deviating from the perforation of said first and third lamella which only permits the passage of said pins which are subject to the action of said helical compression spring when said bolt pulls the closed panel shut, wherein holes of the perforation in said second lamella are formed as oblong holes.

9. A sunroof according to claim 8, wherein said panel may be removed from said frame by unlocking said lower link from a coupling point on the frame side of said lower link and by unhinging said hinged mounting.

10. A sunroof for a motor vehicle having a roof opening, the sunroof comprising a roof frame locatable in the roof opening for defining the perimeter of the roof opening;

at least one panel fitting within the roof frame arranged to close the roof opening,
said panel hingedly mounted to said roof frame at a forward panel edge so that said panel can pivot about said hinged mounting so as to rise at a rear panel edge to open the sunroof;

a positioning device arranged adjacent the rear panel edge to hold said panel open,
said positioning device comprising at least an upper link and a lower link connected pivotally together at a knee joint which is movable with respect to said roof frame, said upper link being connected to said panel at the end of said panel opposite said knee joint, and said lower link being connected to said roof frame, said knee joint being such that said links form at least a part of a lamella pack;

a clamp adjacent said knee joint to lock said knee joint, said clamp including a biased pressure piece external said links, such that adjacent lamellae are frictionally interactable under a compressive force produced by said biased pressure piece to lock said knee joint.

11. A sunroof according to claim 10, wherein said pressure piece is biased by a spring located within a cylindrical sleeve, said sleeve aligned coaxially with and fixed at one end to a knee joint shaft which passes transversely through said lamella pack in a pivot axis.

12. A sunroof according to claim 10, further comprising a Bowden cable, a core of which at one end of said Bowden cable engages said pressure piece to axially relieve said compressive force acting on said lamella pack and unlock said knee joint.

13. A sunroof according to claim 12, further comprising a rotary handle attached to an opposite end of said Bowden cable, said rotary handle device operable to axially retract said pressure piece and relieve said compressive force acting on said lamella pack.

14. A sunroof for a motor vehicle having a roof opening, the sunroof comprising a roof frame locatable in the roof opening for defining the perimeter of the roof opening;

at least one panel fitting within the roof frame arranged to close the roof opening,
said panel hingedly mounted to said roof frame at a forward panel edge so that said panel can pivot about said hinged mounting so as to rise at a rear panel edge to open the sunroof;

a positioning device arranged adjacent the rear panel edge to hold said panel open,
said positioning device comprising at least an upper link and a lower link connected pivotally together at a knee joint which is movable with respect to said roof frame,
said upper link being connected to said panel at the end of said panel opposite said knee joint, and said lower link being connected to said roof frame, said knee joint being such that said links form at least a part of a lamella pack;

a clamp adjacent said knee joint to lock said knee joint, said clamp including a spring biased pressure piece external said lamella pack, such that adjacent lamellae are frictionally interactable under a compressive force produced by said spring biased pressure piece; and a Bowden cable, a core of which at one end of said Bowden cable engages said pressure piece to axially relieve said compressive force acting on said lamella pack and unlock said knee joint.

15. A sunroof according to claim 14, further comprising a rotary handle attached to an opposite end of said Bowden cable, said rotary handle device operable to axially retract said pressure piece and relieve said compressive force acting on said lamella pack.

16. A sunroof according to claim 14, wherein said spring is located within a cylindrical sleeve, said sleeve aligned coaxially with and fixed at one end to a knee joint shaft which passes transversely through said lamella pack in a pivot axis.

* * * * *